United States Patent
Akkiraju et al.

(10) Patent No.: US 10,410,631 B2
(45) Date of Patent: *Sep. 10, 2019

(54) RECOMMENDING A DIALOG ACT USING MODEL-BASED TEXTUAL ANALYSIS

(71) Applicant: International Business Machines Corporation, Armonk, NY (US)

(72) Inventors: Rama Kalyani T. Akkiraju, Cupertino, CA (US); Mansurul Bhuiyan, San Jose, CA (US); Pritam S. Gundecha, San Jose, CA (US); Jalal U. Mahmud, San Jose, CA (US); Shereen Oraby, Santa Cruz, CA (US); Vibha S. Sinha, Santa Clara, CA (US); Sabina Tomkins, Santa Cruz, CA (US); Anbang Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,909

(22) Filed: Jun. 8, 2017

(65) Prior Publication Data

US 2018/0307674 A1 Oct. 25, 2018

Related U.S. Application Data

(63) Continuation of application No. 15/491,683, filed on Apr. 19, 2017.

(51) Int. Cl.
*G10L 15/22* (2006.01)
*G06F 17/27* (2006.01)
(Continued)

(52) U.S. Cl.
CPC ............ *G10L 15/22* (2013.01); *G06F 17/279* (2013.01); *G06N 7/005* (2013.01); *G06N 20/00* (2019.01)

(58) Field of Classification Search
CPC ....................................................... G10L 15/22
See application file for complete search history.

(56) References Cited

U.S. PATENT DOCUMENTS

| 5,208,748 A | 5/1993 | Flores et al. | |
| 6,970,821 B1 * | 11/2005 | Shambaugh | .......... G06F 17/277 379/88.01 |

(Continued)

FOREIGN PATENT DOCUMENTS

JP  2003141149 A  5/2003

OTHER PUBLICATIONS

NIST Cloud Computing Program, Dec. 9, 2013, pp. 1-2, Retrieved From http://www.nist.gov/itl/cloud/.

(Continued)

*Primary Examiner* — Douglas Godbold
(74) *Attorney, Agent, or Firm* — Zilka-Kotab, P.C.

(57) ABSTRACT

A computer-implemented method according to one embodiment includes receiving, utilizing a processor, textual data associated with a real-time conversation between a first participant and a second participant, receiving, utilizing the processor, an objective of the first participant for the real-time conversation between the first participant and the second participant, determining, utilizing the processor, a dialog act to be entered by the first participant at a current point in the real-time conversation that meets the objective, utilizing a model, and returning, utilizing the processor, the dialog act to the first participant.

11 Claims, 10 Drawing Sheets

(51) Int. Cl.
*G06N 20/00* (2019.01)
*G06N 7/00* (2006.01)

(56) References Cited

U.S. PATENT DOCUMENTS

| | | | | |
|---|---|---|---|---|
| 7,305,345 | B2* | 12/2007 | Bares | G06Q 30/02 379/88.01 |
| 8,094,790 | B2* | 1/2012 | Conway | H04M 3/42221 379/265.01 |
| 9,473,637 | B1* | 10/2016 | Venkatapathy | H04M 3/5175 |
| 9,692,895 | B1 | 6/2017 | Ouimette et al. | |
| 10,224,032 | B2 | 3/2019 | Akkiraju et al. | |
| 10,304,451 | B2 | 5/2019 | Akkiraju et al. | |
| 2004/0162724 | A1* | 8/2004 | Hill | G10L 15/1822 704/231 |
| 2005/0105712 | A1* | 5/2005 | Williams | G10L 13/027 379/265.02 |
| 2008/0235018 | A1* | 9/2008 | Eggen | G10L 15/26 704/251 |
| 2010/0124325 | A1* | 5/2010 | Weng | G10L 15/22 379/265.11 |
| 2014/0164532 | A1 | 6/2014 | Lynch et al. | |
| 2014/0307859 | A1* | 10/2014 | Karimi-Cherkandi | H04M 3/42221 379/68 |
| 2015/0228275 | A1 | 8/2015 | Watanabe et al. | |
| 2016/0036975 | A1 | 2/2016 | O'Connor et al. | |
| 2016/0164813 | A1* | 6/2016 | Anderson | H04L 51/16 709/206 |
| 2016/0352907 | A1* | 12/2016 | Raanani | H04M 3/5175 |
| 2017/0118339 | A1 | 4/2017 | Watson et al. | |
| 2017/0316775 | A1* | 11/2017 | Le | G10L 15/16 |
| 2018/0307672 | A1 | 10/2018 | Akkiraju et al. | |
| 2018/0307673 | A1 | 10/2018 | Akkiraju et al. | |
| 2018/0307675 | A1 | 10/2018 | Akkiraju et al. | |
| 2019/0156829 | A1 | 5/2019 | Akkiraju et al. | |

OTHER PUBLICATIONS

Mell et al., "Definition of Cloud Computing," National Institute of Standards and Technology, Information Technology Laboratory, Version 15, 2009, pp. 1-2.

Mell et al., "Definition of Cloud Computing," NIST Special Publication 800-145, 2001, pp. 1-7.

Stolcke et al., "Dialogue Act Modeling for Automatic Tagging and Recognition of Conversational Speech." Speech Technology and Research Laboratory, SRI International, vol. 26, No. 3, 2000, pp. 1-34.

Kluwer et al., "Using Syntactic and Semantic Based Relations for Dialogue Act Recognition," Coling, Poster Volume, 2010, pp. 570-578.

Schriffin, A., "Modeling Speech Acts in Conversational Discourse," The University of Leeds, School of Computing, May 2005, pp. 1-312.

Bunt et al., "Towards an ISO Standard for Dialogue Act Annotation," LREC'10, 2010, pp. 2548-2555.

Vosoughi et al., "Tweet Acts: A Speech Act Classifier for Twitter," Association for the Advancement of Artificial Intelligence, 2016, pp. 1-4.

Zhang et al., "What Are Tweeters Doing: Recognizing Speech Acts in Twitter," Analyzing Microtext: Papers from the 2011 AAAI Workshop, 2011, pp. 86-91.

Kim et al, "Classifying Dialogue Acts in one-on-one Live Chats," Conference on Empirical Methods in Natural Language Processing, 2010, pp. 862-871.

Jeong et al., "Semi-supervised Speech Act Recognition in Emails and Forums," Conference on Empirical Methods in Natural Language Processing, Aug. 2009, pp. 1250-1259.

Robopsychology, "Dialog Act Recognition 2014," 2014, retrieved from http://meta-guide.com/dialog-act-recognition-2014, pp. 1-6.

Zhang et al., "Towards Scalable Speech Act Recognition on Twitter: Tackling Insufficient Training Data," 2012, retrieved from http://www.aclweb.org/anthology/W12-0603, pp. 18-27.

Tur et al., "Model Adaptation for Dialog Act Tagging," 2006, retrieved from https://pdfs.semanticscholar.org/e111/d50f3a67c7f1dde75cfac80fbbff883f2c9d.pdf, pp. 1-4.

Ivanovic, E., "Automatic IM dialogue using statistical model and dialogue acts," Thesis, Minerva Access, University of Melbourne, Jul. 2008, pp. 1-195.

Akkiraju et al., U.S. Appl. No. 15/491,683, filed Apr. 19, 2017.

Akkiraju et al., U.S. Appl. No. 15/491,745, filed Apr. 19, 2017.

Non-Final Office Action from U.S. Appl. No. 15/491,745, dated Apr. 20, 2018.

Non-Final Office Action from U.S. Appl. No. 15/491,683, dated May 4, 2018.

Akkiraju et al., U.S. Appl. No. 15/617,930, filed Jun. 8, 2017.

Notice of Allowance from U.S. Appl. No. 15/491,745, dated Oct. 19, 2018.

Non-Final Office Action from U.S. Appl. No. 15/617,930, dated Aug. 29, 2018.

Final Office Action from U.S. Appl. No. 15/491,683, dated Sep. 11, 2018.

Young et al., "POMDP-Based Statistical Spoken Dialog Systems: A Review," Proceedings of the IEEE, vol. 101, No. 5, May 2013, pp. 1160-1179.

Advisory Action from U.S. Appl. No. 15/491,683, dated Nov. 14, 2018.

Akkiraju et al., U.S. Appl. No. 16/248,651, filed Jan. 15, 2019.

Notice of Allowance from U.S. Appl. No. 15/617,930, dated Jan. 17, 2019.

Notice of Allowance from U.S. Appl. No. 15/491,683, dated Mar. 13, 2019.

Akkiraju et al., U.S. Appl. No. 16/359,829, filed Mar. 20, 2019.

* cited by examiner

RECOMMENDING A DIALOG ACT USING MODEL-BASED TEXTUAL ANALYSIS

BACKGROUND

The present invention relates to textual data analysis, and more specifically, this invention relates to analyzing textual communications and making recommendations based on the analysis.

Communication between two or more participants is an integral part of modern society. For example, many entities rely on effective communication between their representatives and other users in order to resolve issues. However, current prediction analytics do not implement measures to optimize a probability of a particular outcome occurring for a participant in the conversation.

SUMMARY

A computer-implemented method according to one embodiment includes receiving, utilizing a processor, textual data associated with a real-time conversation between a first participant and a second participant, receiving, utilizing the processor, an objective of the first participant for the real-time conversation between the first participant and the second participant, determining, utilizing the processor, a dialog act to be entered by the first participant at a current point in the real-time conversation that meets the objective, utilizing a model, and returning, utilizing the processor, the dialog act to the first participant.

Other aspects and embodiments of the present invention will become apparent from the following detailed description, which, when taken in conjunction with the drawings, illustrate by way of example the principles of the invention.

DETAILED DESCRIPTION

Figure 1:
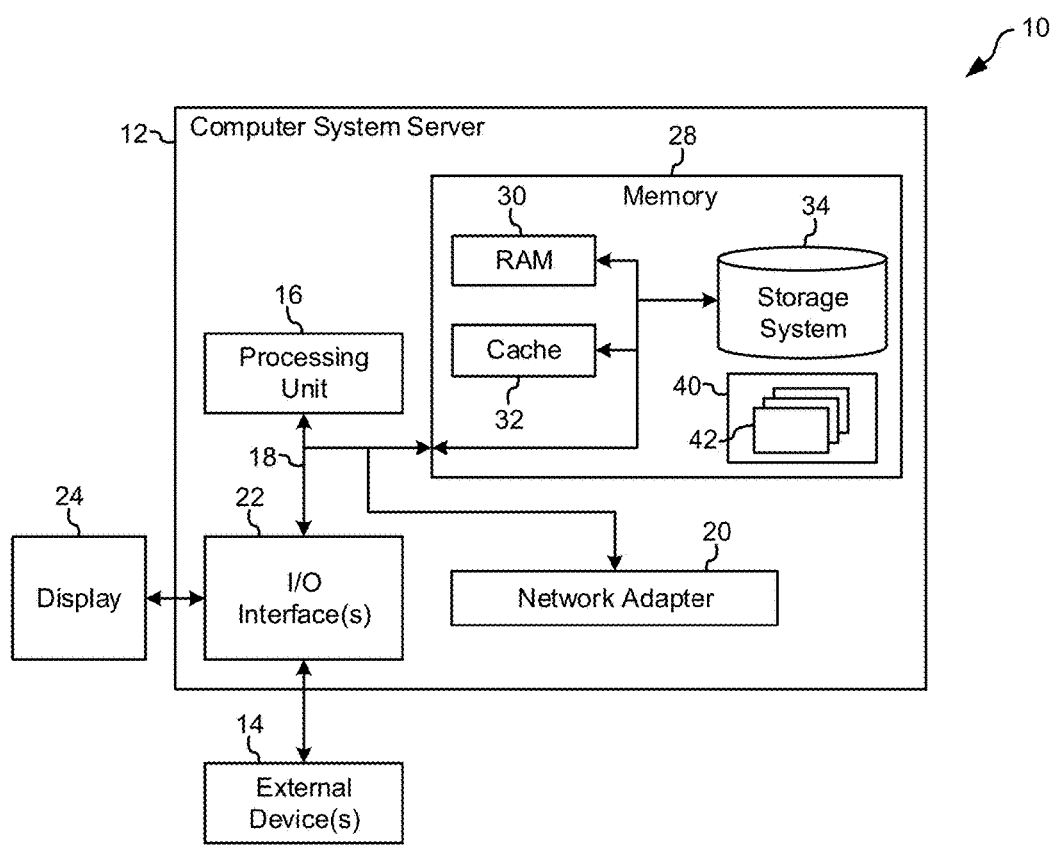
FIG. 1 depicts a cloud computing node according to an embodiment of the present invention.

The following description discloses several preferred embodiments of systems, methods and computer program products for recommending a dialog act using model-based textual analysis. Various embodiments provide a method to analyze real-time conversation data and suggest a dialog act that meets an objective of a participant in the communication.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for recommending a dialog act using model-based textual analysis.

In one general embodiment, a computer-implemented method includes receiving, utilizing a processor, textual data associated with a real-time conversation between a first participant and a second participant, receiving, utilizing the processor, an objective of the first participant for the real-time conversation between the first participant and the second participant, determining, utilizing the processor, a dialog act to be entered by the first participant at a current point in the real-time conversation that meets the objective, utilizing a model, and returning, utilizing the processor, the dialog act to the first participant.

In another general embodiment, a computer program product for recommending a dialog act to a participant in a conversation includes a computer readable storage medium having program instructions embodied therewith, wherein the computer readable storage medium is not a transitory signal per se, where the program instructions are executable by a processor to cause the processor to perform a method comprising receiving textual data associated with a real-time conversation between a first participant and a second participant, utilizing the processor, receiving an objective of the first participant for the real-time conversation between the first participant and the second participant, utilizing the processor, determining, utilizing the processor, a dialog act to be entered by the first participant at a current point in the real-time conversation that meets the objective, utilizing a model, and returning the dialog act to the first participant, utilizing the processor.

In another general embodiment, a system includes a processor, and logic integrated with the processor, executable by the processor, or integrated with and executable by the processor, where the logic is configured to receive, utilizing the processor, textual data associated with a real-time conversation between a first participant and a second participant, receive, utilizing the processor, an objective of the first participant for the real-time conversation between the first participant and the second participant, determine, utilizing the processor, a dialog act to be entered by the first participant at a current point in the real-time conversation that meets the objective, utilizing a model, and return, utilizing the processor, the dialog act to the first participant.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
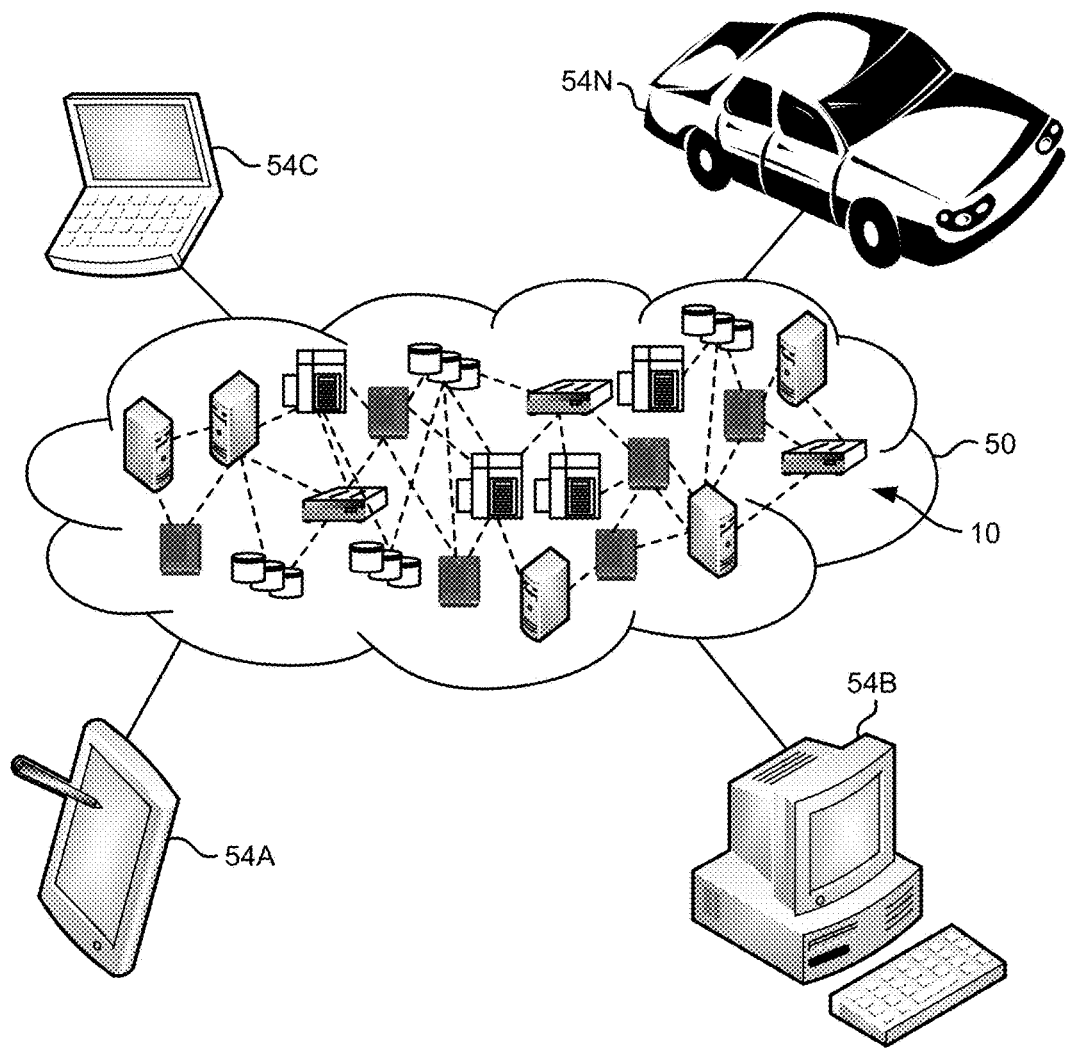
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
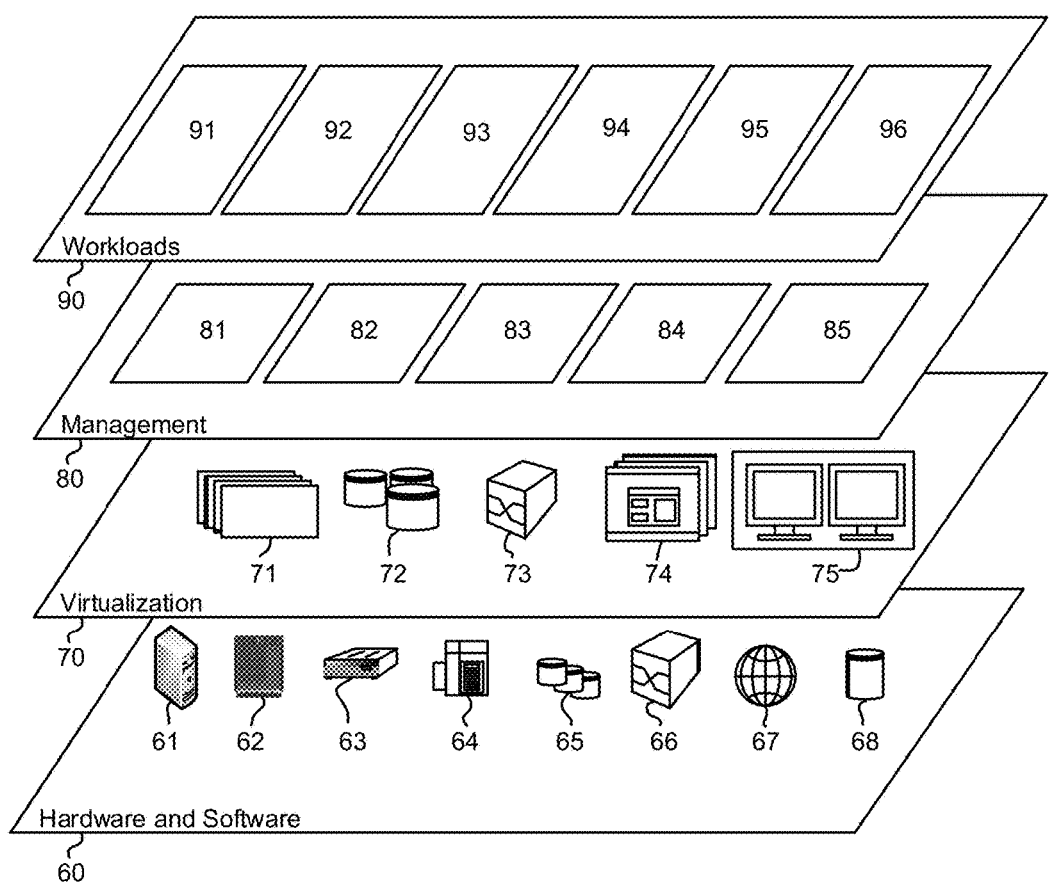
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and card stunt as a service (CaaS) 96.

Figure 4:
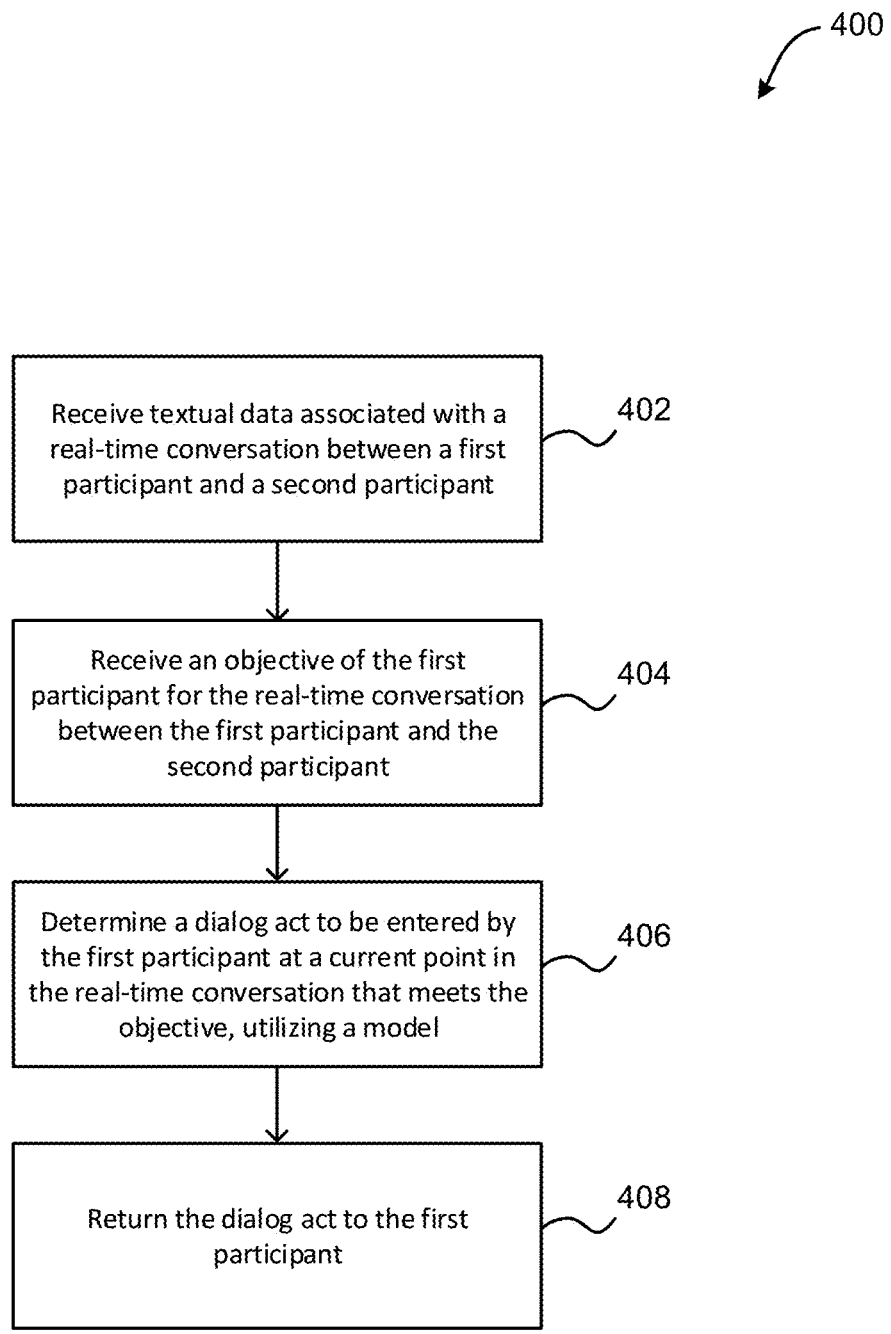
FIG. 4 illustrates a method for recommending a dialog act to a participant in a conversation, in accordance with one embodiment.

Now referring to FIG. 4, a flowchart of a method 400 for recommending a dialog act to a participant in a conversation is shown according to one embodiment. The method 400 may be performed in accordance with the present invention in any of the environments depicted in FIGS. 1-3 and 8-9, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where textual data associated with a real-time conversation between a first participant and a second participant is received. In one embodiment, the textual data may be created from one or more spoken utterances. For example, a speech-to-text application may create the textual data from a spoken conversation between the first participant and the second participant.

Additionally, in one embodiment, the textual data may include a plurality of words, terms, and/or other typewritten information sent between the first participant and the second participant during the real-time conversation. In another embodiment, the real-time conversation may include a conversation that is occurring in real-time between the first participant and the second participant. In yet another embodiment, the first participant and the second participant may each include an individual (e.g., a human user, etc.) or an automated application.

Further, in one embodiment, the real-time conversation may include a customer service conversation. For example, the first participant may include a customer service representative (CSR), and the second participant may include a customer (e.g., a consumer of a good or service). In another embodiment, the textual data may include a conversation flow between the first participant and the second participant. For example, the conversation flow may include a plurality of conversation turns. In another example, each conversation turn may include an individual exchange of textual data from the first participant to the second participant, or from the second participant to the first participant. In yet another example, each conversation turn may be made in response to a preceding conversation turn.

Further still, in one embodiment, the textual data may be identified by hardware in a computing device. For example, the hardware may include one or more processors. In another example, the computing device may include a server, a cloud computing environment, etc. In another embodiment, the textual data may be received as a result of monitoring the real-time conversation. In yet another embodiment, the real-time conversation may include additional participants in addition to the first participant and the second participant.

Additionally, as shown in FIG. 4, method 400 may proceed with operation 404, where an objective of the first participant for the real-time conversation between the first participant and the second participant is received. In one embodiment, the objective may include textual data indicating a desired outcome of the real-time conversation for the first participant. In another embodiment, the objective may include a maximization of satisfaction of the second participant with respect to the real-time conversation, a minimization of frustration by the second participant with respect to the real-time conversation, a resolution of a problem of the second participant as a result of the real-time conversation, an answering of a question by the first participant during the real-time conversation, etc. In yet another embodiment, the objective may be selected from one or more pre-determined options (e.g., by the first participant, etc.).

Also, as shown in FIG. 4, method 400 may proceed with operation 406, where a dialog act to be entered by the first participant at a current point in the real-time conversation that meets the objective is determined, utilizing a model. In one embodiment, the dialog act may include a description of an action that is to be performed by the sending of one or more portions of the textual data from one participant to another participant within the real-time conversation. In another embodiment, the action may include apologizing, asking a yes/no question, providing an informative statement, requesting information, acknowledging a statement made by another participant, etc.

Furthermore, in one embodiment, the current point in the real-time conversation may include a current turn for the first participant in the conversation. For example, the real-time conversation may include a turn-taking conversation where the first participant and the second participant speak one at a time in alternating turns. In another example, the current point in the real-time conversation may include a current opportunity for the first participant to input textual data within the real-time conversation (e.g., in response to a previous turn taken by the second participant, etc.).

Further still, in one embodiment, a dialog act may be determined that maximizes a probability of the objective of the first participant being achieved during the current point in the real-time conversation. In another embodiment, for each of a plurality of different dialog acts, a likelihood that the dialog act will achieve the objective of the first participant at the current point in the real-time conversation may be determined.

For example, each dialog act may be scored, where a lower score may indicate that the dialog act will be less likely to achieve the objective of the first participant at the current point in the real-time conversation when compared to a dialog act with a higher validity score. In another example, a dialog act with a highest score may be selected.

Also, in one embodiment, the dialog act may be analyzed in association with earlier points in the real-time conversation (e.g., previous turns taken within the real-time conversation by the first participant and the second participant). In another embodiment, the dialog act may be analyzed in association with earlier conversations other than the real-time conversation. In yet another embodiment, the dialog act may be applied to the model, where the model is trained using earlier conversations.

For example, the earlier conversations may include one or more conversations of the first participant and the second participant. In another example, the model may be trained by identifying one or more of dialog acts, features, and objectives of the earlier conversations. For instance, the features may include one or more of n-grams (e.g., sequences of one or more words) within the textual data, temporal or topic based information, tone/emotion, etc. In yet another example, the model may identify one or more of dialog acts, features, and the objective of the real-time conversation. In still another example, the model may include a sequential machine learning model (e.g., a Markov Model, etc.).

Additionally, as shown in FIG. 4, method 400 may proceed with operation 408, where the dialog act is returned to the first participant. In one embodiment, returning the dialog act may include displaying the dialog act to the first participant. In another embodiment, additional textual data may be received from the first participant in response to the returning of the dialog act.

For example, an additional dialog act associated with the additional textual data may be determined. In another example, the additional dialog act may be compared to the returned dialog act. In yet another example, the additional textual data may be conditionally entered, based on the comparison. For instance, the additional textual data may be entered at the current point in the real-time conversation when it is determined that the additional dialog act matches the returned dialog act. In another instance, the additional textual data may not be entered at the current point in the real-time conversation when it is determined that the additional dialog act does not match the returned dialog act.

Further, in one embodiment, a plurality of different objectives of the first participant (or other participants different from the first participant) may be received for the real-time conversation between the first participant and the second participant, and for each different objective, a different dialog act to be entered by the first participant at a current point in the real-time conversation that maximizes a probability of the objective being achieved during the current point in the real-time conversation may be determined and returned.

Further still, in one embodiment, a plurality of dialog acts to be entered by the first participant at a current point in the real-time conversation may be determined that meet the objective, utilizing the model. In another embodiment, each of the plurality of dialog acts may be returned to the first participant in an ordered list. For example, for each of the plurality of dialog acts, a probability that the dialog act will meet the objective may be determined, and the list may be ordered by this probability.

In this way, objective-oriented dialog acts may be determined, utilizing a constructed analytical model. By offering dialog acts based on prior conversation turns with a goal of achieving an optimal implementation of a specifically stated objective, this implementation may improve upon earlier prediction implementations, which may only perform basic recognition and labeling actions/analysis. Additionally, more accurate dialog act suggestions may minimize a necessary amount of turns within a conversation, which may reduce an amount of network traffic between the first participant and the second participant as well as processing resources necessary to implement such conversation (e.g., at a device of the first and/or second participant, at a network data transmission device, etc.).

Figure 5:
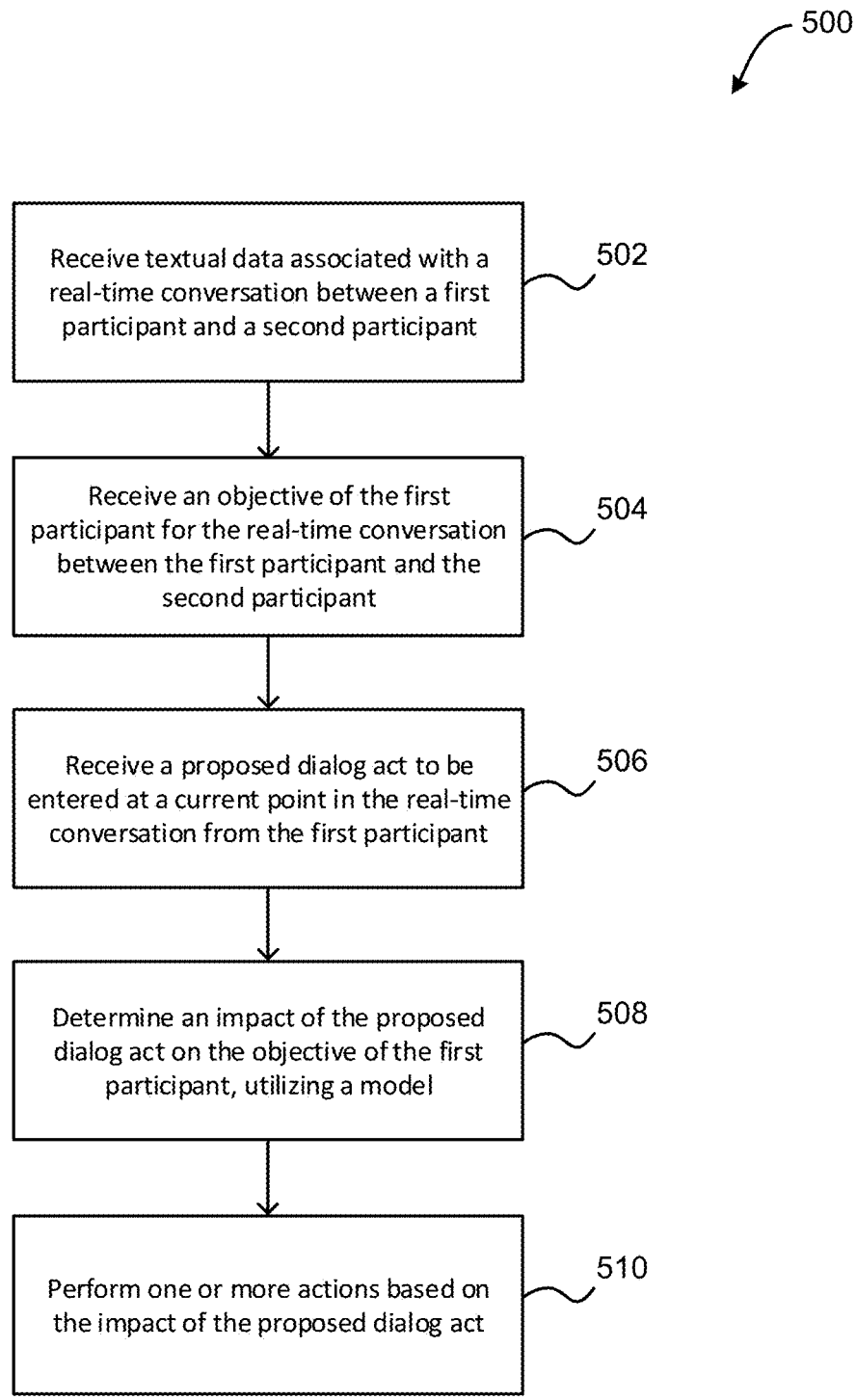
FIG. 5 illustrates a method for determining an impact of a proposed dialog act in a conversation, in accordance with one embodiment.

Now referring to FIG. 5, a flowchart of a method 500 for determining an impact of a proposed dialog act in a conversation is shown according to one embodiment. The method 500 may be performed in accordance with the present invention in any of the environments depicted in FIGS. 1-3 and 8-9, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where textual data associated with a real-time conversation between a first participant and a second participant is received. Additionally, method 500 may proceed with operation 504, where an objective of the first participant for the real-time conversation between the first participant and the second participant is received. Further, method 500 may proceed with operation 506, where a proposed dialog act to be entered at a current point in the real-time conversation is received from the first participant.

In one embodiment, the proposed dialog act may include a description of an action that is to be performed by the sending of one or more portions of the textual data from one participant to another participant within the real-time conversation. In another embodiment, the action may include apologizing, asking a yes/no question, providing an informative statement, requesting information, acknowledging a statement made by another participant, etc.

Further still, in one embodiment, the current point in the real-time conversation may include a current turn for the first participant in the conversation. For example, the real-time conversation may include a turn-taking conversation where the first participant and the second participant speak one at a time in alternating turns. In another example, the current point in the real-time conversation may include a current opportunity for the first participant to input textual data within the real-time conversation (e.g., in response to a previous turn taken by the second participant, etc.).

Also, in one embodiment, the proposed dialog act may be identified from textual input provided by the first participant. For example, the textual input may be analyzed in order to determine the proposed dialog act that is implemented through the textual input.

In addition, method 500 may proceed with operation 508, where an impact of the proposed dialog act on the objective of the first participant is determined, utilizing a model. In one embodiment, determining the impact may include scoring the proposed dialog act on a predetermined scale. For example, the impact may include a validity score for the proposed dialog act. In another example, the validity score may be on a predetermined scale (e.g., 1-10, etc.).

Furthermore, in one embodiment, determining the impact may include determining an amount that the proposed dialog act will change a probability of the objective of the first participant being achieved during the current point in the real-time conversation. In another embodiment, determining the impact may include determining a likelihood that the proposed dialog act will achieve the objective of the first participant at the current point in the real-time conversation. For example, a lower validity score may indicate that the proposed dialog act will be less likely to achieve the objective of the first participant at the current point in the real-time conversation when compared to a proposed dialog act with a higher validity score.

Further still, in one embodiment, determining the impact may include analyzing the proposed dialog act in association with earlier points in the real-time conversation (e.g., previous turns taken within the real-time conversation by the first participant and the second participant). In another embodiment, determining the impact may include analyzing the proposed dialog act in association with earlier conversations other than the real-time conversation.

Also, in one embodiment, determining the impact may include applying the proposed dialog act to the model, where the model is trained using earlier conversations. For example, earlier conversations may include one or more of the first participant and the second participant. In another example, the model may be trained by identifying dialog acts, features, and objectives of the earlier conversations. In yet another example, the features may include one or more of n-grams (e.g., sequences of one or more words) within the textual data, temporal or topic based information, tone/emotion, etc. In still another example, the model may identify dialog acts, features, and the objective of the real-time conversation. In another example, the model may include a sequential machine learning model (e.g., a Markov Model, etc.).

Additionally, method 500 may proceed with operation 510, where one or more actions are performed, based on the impact of the proposed dialog act. In one embodiment, the one or more actions may include sending a notification including the impact of the proposed dialog act on the objective of the first participant. For example, the notification may be sent to the first participant, an administrator, etc. In another embodiment, the one or more actions may include allowing or denying the proposed dialog act, based on the impact. For example, if the impact is below a threshold, the proposed dialog act may be entered at the current point in the real-time conversation. In another example, if the impact is above a threshold, the proposed dialog act may not be entered at the current point in the real-time conversation.

Further, in one embodiment, the one or more actions may include logging the impact (e.g., within a database, in association with a log of the real-time conversation, etc.). In another embodiment, a plurality of different objectives of the first participant (or other participants different from the first participant) may be received for the real-time conversation between the first participant and the second participant, and an impact of the proposed dialog act on each objective may be determined.

In this way, an impact of proposed dialog acts may be determined in an objective-oriented manner, utilizing a constructed analytical model. By analyzing proposed dialog acts based on prior conversation turns with a goal of achieving an optimal implementation of a specifically stated objective, this implementation may improve upon earlier prediction implementations, which may only perform basic recognition and labeling actions/analysis. Additionally, analyzing and potentially filtering proposed dialog acts based on their impact may result in more efficient dialog acts being used within a conversation, which may minimize a necessary amount of turns within the conversation, and which may in turn reduce an amount of network traffic between the first participant and the second participant as well as processing resources necessary to implement such conversation (e.g., at a device of the first and/or second participant, at a network data transmission device, etc.).

Figure 6:
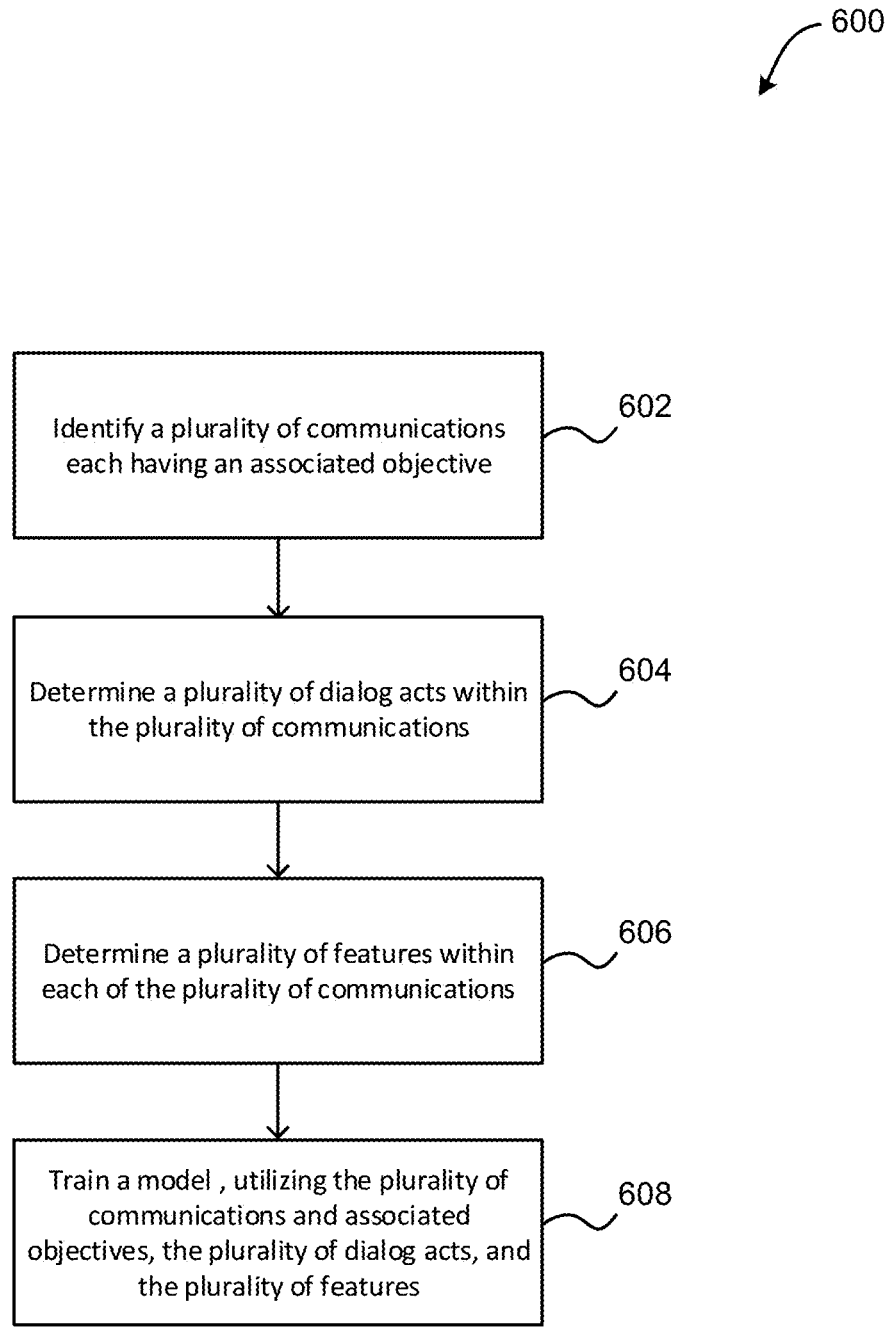
FIG. 6 illustrates a method for training a model to determine dialog acts for a conversation, in accordance with one embodiment.

Now referring to FIG. 6, a flowchart of a method 600 for training a model to determine dialog acts for a conversation is shown according to one embodiment. The method 600 may be performed in accordance with the present invention in any of the environments depicted in FIGS. 1-3 and 8-9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a plurality of communications each having an associated objective are identified. In one embodiment, the plurality of communications may include a plurality of historical conversations. In another embodiment, the historical conversations may be identified as a result of monitoring. In yet another embodiment, each historical conversation may have an identified objective. In still another embodiment, each historical conversation may be between a first and second participant, or between other participants.

Additionally, method 600 may proceed with operation 604, where a plurality of dialog acts are determined within the plurality of communications. In one embodiment, one or more of the plurality of dialog acts may be automatically identified (e.g., utilizing a pre-trained dialog act classifier, etc.). In another embodiment, one or more of the plurality of dialog acts may be manually identified.

Further, method 600 may proceed with operation 606, where a plurality of features are determined within each of the plurality of communications. Table 1 illustrates exemplary features that may be determined from the plurality of communications, in accordance with one embodiment. Of course, it should be noted that the exemplary features shown in Table 1 are set forth for illustrative purposes only, and thus should not be construed as limiting in any manner.

TABLE 1

An indication of a current turn in the dialog
One or more previous dialog acts from opposite participant (e.g., customer in a TABLE 1-continued customer-agent conversation). Such dialog acts may be manually labeled or may be detected using a trained dialog act classifier.
A previous dialog act from current participant (e.g. the agent)
One or more personality attributes of both participants
A topic of the dialog computed from previous conversations
One or more tones exhibited in previous turns
An outcome of the conversation
Word usage/Punctuation: binary bag-of-word unigrams, binary existence of a question mark, binary existence of an exclamation mark
Temporal values: response time of a turn (time in seconds elapsed between the posting time of the previous turn and that of the current turn)
Second-Person Reference values: existence of an explicit second-person reference in the turn (you, your, you're)
Emotion values for participants: count of words in each of the 8 emotion classes from the NRC emotion lexicon (anger, anticipation, disgust, fear, joy, negative, positive, sadness, surprise, and trust)
Dialog values: lexical indicators for opening greetings (hi, hello, greetings, etc.), closing greetings (bye, goodbye), yes-no questions (turns with questions starting with do, did, can, could, etc.), wh-questions (turns with questions starting with who, what, where, etc.), thanking (thank*), apology (sorry, apolog*), yes-answer, and no-answer Also, method 600 may proceed with operation 608, where a model is trained, utilizing the plurality of communications and associated objectives, the plurality of dialog acts, and the plurality of features. In one embodiment, the training may include associating each of the plurality of dialog acts with one or more features and an associated objective within the plurality of communications. In another embodiment, the model may include a sequential machine learning model (e.g., a Markov model, etc.). In yet another embodiment, the model may determine a dialog act to be entered that maximizes an associated objective based on the communications and plurality of features.

Figure 7:
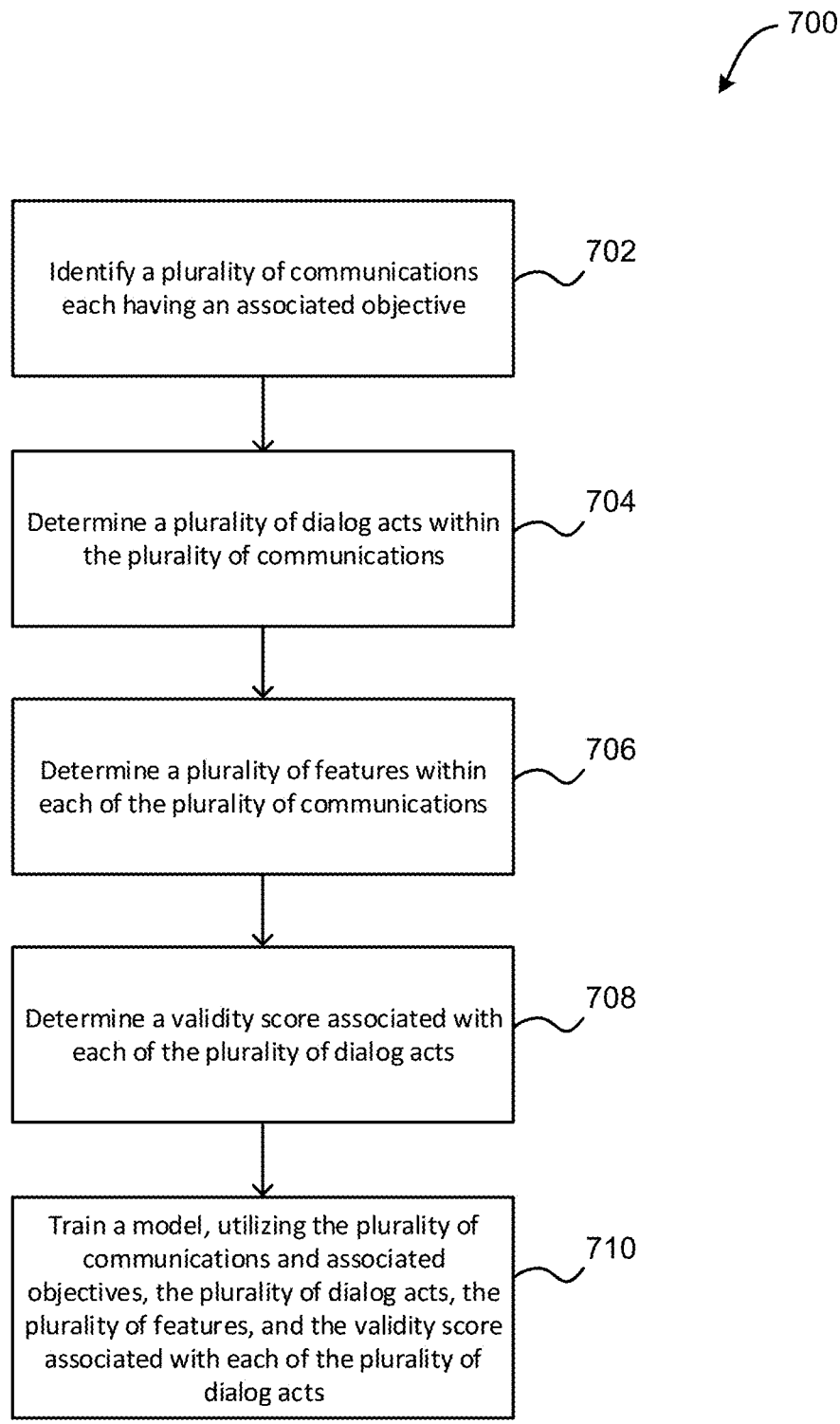
FIG. 7 illustrates a method for training a model to score proposed dialog acts for a conversation, in accordance with one embodiment.

Now referring to FIG. 7, a flowchart of a method 700 for training a model to score proposed dialog acts for a conversation is shown according to one embodiment. The method 700 may be performed in accordance with the present invention in any of the environments depicted in FIGS. 1-3 and 8-9, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a plurality of communications each having an associated objective are identified. In one embodiment, the plurality of communications may include a plurality of historical conversations. In another embodiment, the historical conversations may be identified as a result of monitoring. In yet another embodiment, each historical conversation may have an identified objective. In still another embodiment, each historical conversation may be between a first and second participant, or between other participants.

Additionally, method 700 may proceed with operation 704, where a plurality of dialog acts are determined within the plurality of communications. In one embodiment, one or more of the plurality of dialog acts may be automatically identified (e.g., utilizing a pre-trained dialog act classifier, etc.). In another embodiment, one or more of the plurality of dialog acts may be manually identified.

Further, method 700 may proceed with operation 706, where a plurality of features are determined within each of the plurality of communications. Table 1 illustrates exemplary features that may be determined from the plurality of communications, in accordance with one embodiment.

Further still, method 700 may proceed with operation 708, where a validity score associated with each of the plurality of dialog acts is determined. In one embodiment, the validity score for a dialog act may include an impact of the dialog act on the objective of the communication. For example, the validity score may indicate whether the associated dialog act helped achieve the objective of the communication, and to what degree. In another embodiment, the validity score may be a numerical value (e.g., a whole number on a scale of 1-10, etc.).

Also, method 700 may proceed with operation 710, where a model is trained, utilizing the plurality of communications and associated objectives, the plurality of dialog acts, the plurality of features, and the validity score associated with each of the plurality of dialog acts. In one embodiment, the training may include associating the validity score associated with each of the plurality of dialog acts with one or more features and an associated objective within the plurality of communications.

Figure 8:
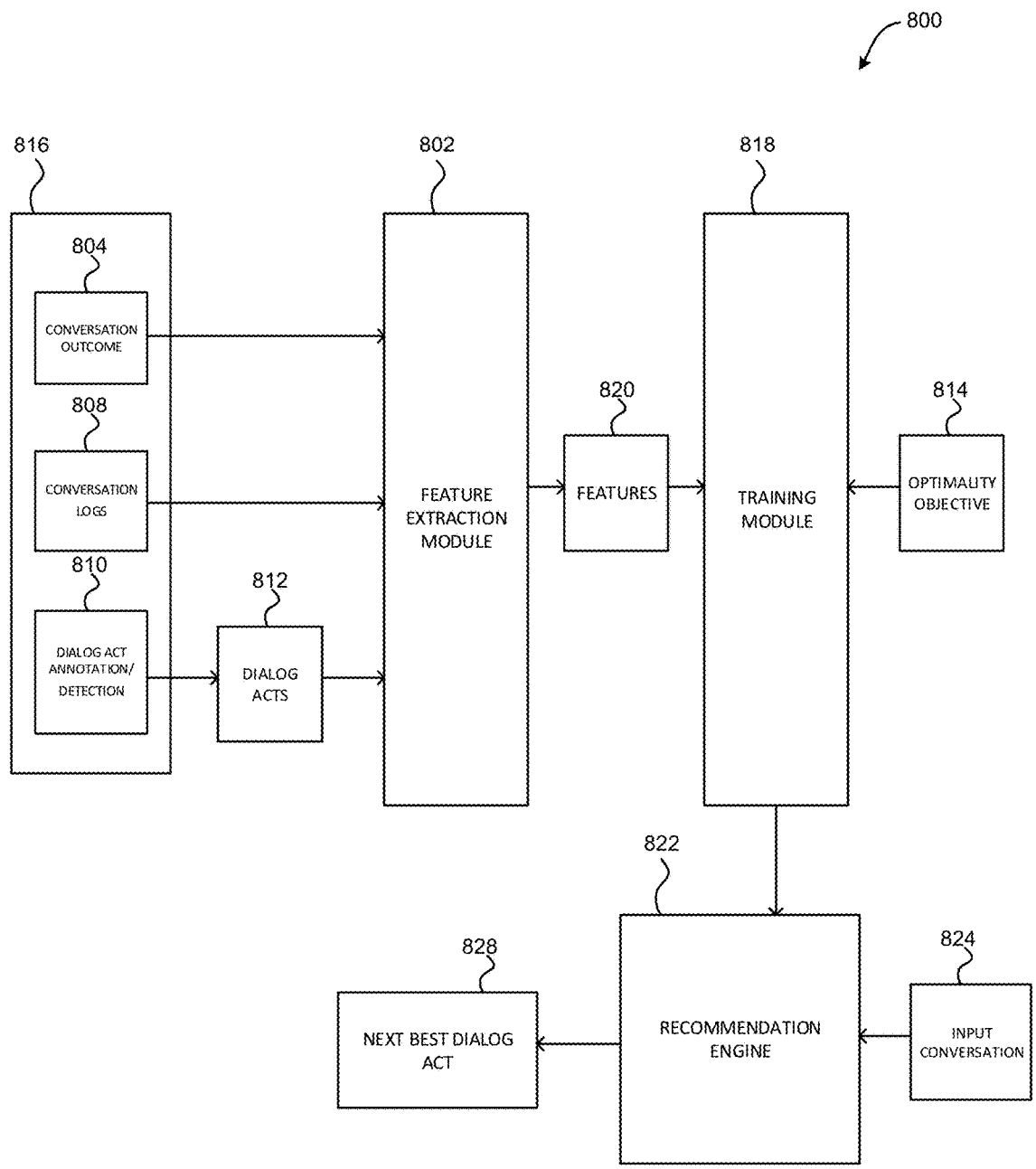
FIG. 8 illustrates an exemplary dialog act recommendation system, in accordance with one embodiment.

FIG. 8 illustrates an exemplary dialog act recommendation system 800, according to one embodiment. As shown, the system 800 includes a feature extraction module 802 that identifies features from inputs 816. The inputs 816 include logged conversations 808 as well as a set of dialog acts 812 extracted from the logged conversations 808 by a dialog act annotation/detection module 810. In one embodiment, each dialog act in the set of dialog acts 812 may be manually identified, or may be detected for each utterance of the logged conversations 808 using a pre-trained dialog act classifier.

The inputs 816 also include associated conversation outcomes 804. For example, the logged conversations 808 may include prior textual communications between different participants, and the associated conversation outcomes 804 of each textual communication. For instance, one example of the logged conversations 808 may include a customer complaint, and one example of the associated conversation outcome 804 for that customer complaint may include customer satisfaction with a CSR's solution to their complaint.

Further, the feature extraction module 802 may extract one or more features from the inputs 816. Table 1 illustrates exemplary features that may be extracted from the plurality of inputs 816, in accordance with one embodiment.

Further still, one or more features 820 extracted from the plurality of inputs 816 by the feature extraction module 802 are sent to the next best dialog act model training module 818. One or more optimality objectives 814 associated with the plurality of inputs 816 are also sent to the training module 818. Utilizing the optimality objectives 814 and the plurality of inputs 816, the training module 818 trains a recommendation engine 822. In one embodiment, the recommendation engine 822 may utilize a machine learning model that is trained by the training module 818.

Also, the trained recommendation engine 822 receives textual data from a real-time conversation 824. The trained recommendation engine 822 may also receive an optimality objective for the real-time conversation 824. In response, the trained recommendation engine 822 may output a recommendation of a next best dialog act 828, which may include a recommended dialog act to be entered during the next turn in the real-time conversation 824 in order of maximize a likelihood of realizing the optimality objective.

In one embodiment, the system 800 may be trained on dialog-act labeled conversations in a customer service scenario, and conversation outcomes (e.g. satisfaction, problem resolution). The conversation may be between human and human (agent), human or automated agent, or between two automated agents. Such conversation can be between two parties, or multiple parties. Using such training examples, the system 800 may train a model that predicts next best response (i.e. dialog act).

Additionally, in one embodiment, machine learning models used by the recommendation engine 822 may set the optimality objective to optimize an outcome such as to maximize customer satisfaction, minimize customer frustration, etc. Thus, the trained models may be used to recommend the next dialog act. In another embodiment, such recommendation may combine dialog acts and tones. A human agent may choose the next dialog act from the recommendations, or ignore the recommendation if he/she wants to. The recommendation may be computed from training a machine learning model from example conversations labeled with dialog acts in each turn. For each such conversation, an outcome may also be labeled. This may serve as the ground truth for training models. Once such a model is trained, for a given conversation flow (unlabelled) and for a given user in the conversation, the model may predict the next best dialog act. Such prediction can be useful to generate a recommendation to human agents, or select appropriate action for an automated agent.

Further, in one embodiment, input to train the machine learning models used by the recommendation engine 822 may include a set of conversations 808, where an outcome 804 of each of the conversations is identified. For each utterance of the conversations 808, a dialog act 812 is either manually identified or detected using a pretrained dialog act classifier. In order to train the model, many such training examples (conversations with their dialog act identified and outcome) may be given.

In the feature extraction module 802, a set of features are extracted the training example inputs 816. Most features may be identified from the content of the conversations 808. However, for computing conversation participant's personality traits, their previous conversations, or text from social media or other sources, may be collected. In one embodiment, such traits may be computed from pre-taken surveys.

The training module 818 also takes an optimality objective 814 as an input (e.g., maximizing customer satisfaction, etc.). From such training example inputs 816, computed features 820, and the optimality objective 814, a machine learning model used by the recommendation engine 822 may be trained. In one embodiment, such a model may be a sequential SVM-HMM that may capture sequential properties of turns in a conversation. Once such a model is trained, it may be used to predict a next best dialog act 828 for an input conversation 824.

Figure 9:
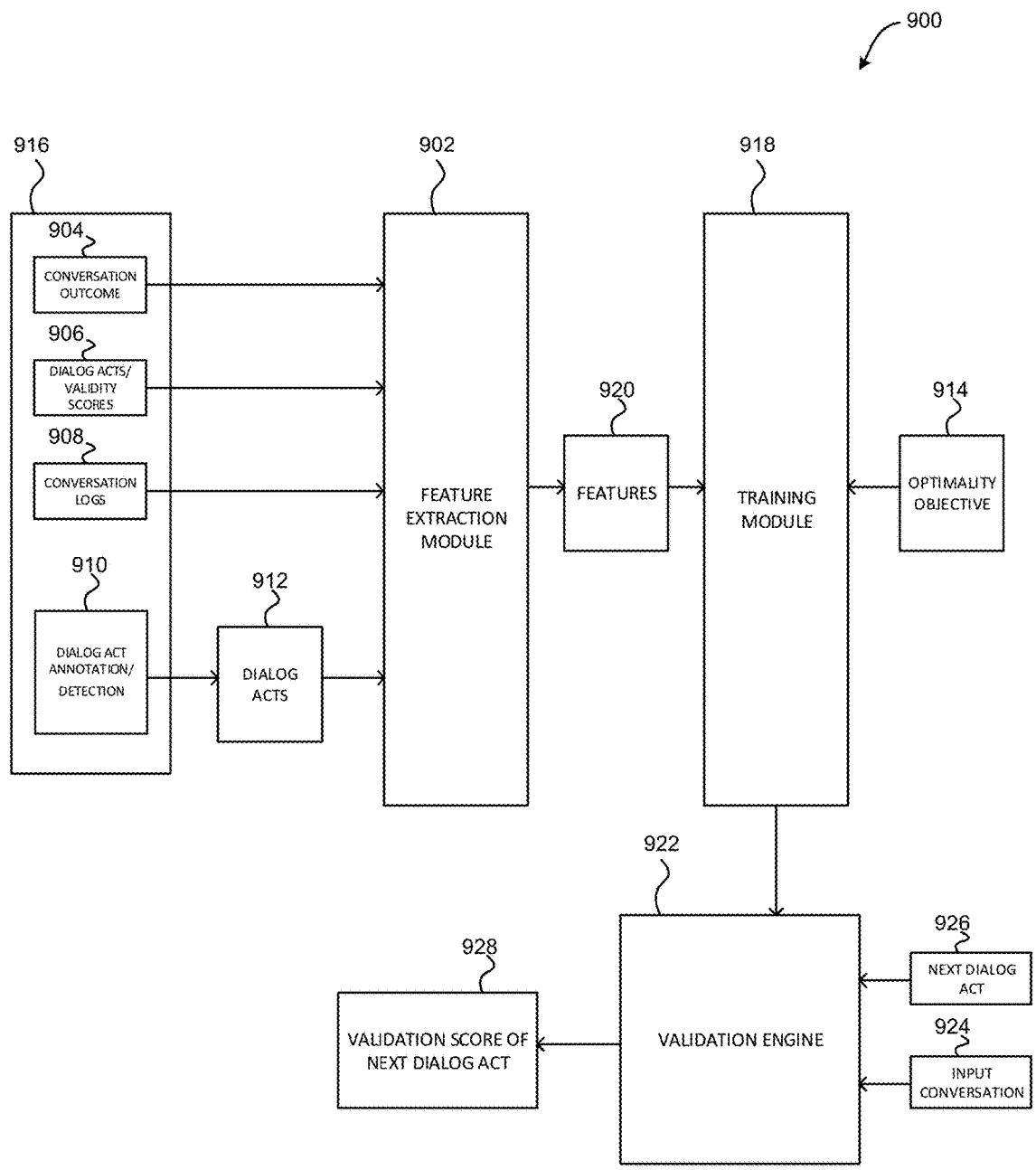
FIG. 9 illustrates an exemplary dialog act validation system, in accordance with one embodiment.

FIG. 9 illustrates an exemplary dialog act validation system 900, according to one embodiment. As shown, the system 900 includes a feature extraction module 902 that identifies features from inputs 916. The inputs 916 include logged conversations 908 as well as a set of dialog acts 912 extracted from the logged conversations 908 by a dialog act annotation/detection module 910. In one embodiment, each dialog act in the set of dialog acts 912 may be manually identified, or may be detected for each utterance of the logged conversations 908 using a pre-trained dialog act classifier.

The inputs 916 also include associated conversation outcomes 904. For example, the logged conversations 908 may include prior textual communications between different participants, and the associated conversation outcomes 904 of each textual communication. For instance, one example of the logged conversations 908 may include a customer complaint, and one example of the associated conversation outcome 904 for that customer complaint may include customer satisfaction with a CSR's solution to their complaint.

Additionally, the inputs 916 further include dialog acts with associated validity scores 906. For example, the dialog acts with associated validity scores 906 may include dialog acts found within the logged conversations 908 that have predetermined validity scores assigned to them. In one embodiment, each of the predetermined validity scores may indicate an effectiveness of the associated dialog act in achieving one or more predetermined optimality objectives.

Further, the feature extraction module 902 may extract one or more features from the inputs 916. Table 1 illustrates exemplary features that may be extracted from the plurality of inputs 916, in accordance with one embodiment.

Further still, one or more features 920 extracted from the plurality of inputs 916 by the feature extraction module 902 are sent to the dialog act validation model training module 918. One or more optimality objectives 914 associated with the plurality of inputs 916 are also sent to the training module 918. Utilizing the optimality objectives 914 and the plurality of inputs 916, the training module 918 trains a validation engine 922.

Also, the trained validation engine 922 receives a proposed dialog act 926 and a real-time conversation 924 in which the proposed dialog act 926 is to be entered. The trained validation engine 922 may also receive an optimality objective for the real-time conversation 924. In response, the trained validation engine 922 may output a validation score 928 for the proposed dialog act 926, which may indicate a likelihood that the proposed dialog act 926 achieves the optimality objective.

Table 2 illustrates an exemplary conversation between a customer and an agent, as well as identified dialog acts, in accordance with one embodiment. Of course, it should be noted that the exemplary conversation shown in Table 2 is set forth for illustrative purposes only, and thus should not be construed as limiting in any manner.

TABLE 2

| TURN # | SPEAKER | MESSAGE TEXT | DIALOG ACTS |
|---|---|---|---|
| 1 | Customer | Love my new SMASHED box for my product! | Complaint, Negative Expressive Statement, Sarcasm |
| 2 | CSR | That's disappointing! Truly sorry. Is the actual product damaged? | Request Info, Yes/No Question, Apology |
| 3 | Customer | No, however, I am a collector and I keep the product in the box. | Negative Answer, Informative Statement |
| 4 | CSR | I understand. Would you like the product to be exchanged? | Acknowledgement, Yes/No Question, Offer |
| 5 | Customer | If possible, yes. I've never made a return though. | Affirmative Answer, Informative Statement |
| 6 | CSR | How did you purchase the product? Did your local store assist with the order? | Open Question, Request Info, Yes/No Question |
| 7 | Customer | I purchased the product online. As far as I know this came straight to my house through the website. | Informative Statement |

Dialog Act Validation Example

In one embodiment, the conversation in Table 2 may be a real-time conversation. In another embodiment, the objective of the conversation for the CSR in Table 2 may be identified as "customer satisfaction." For this conversation, the CSR may submit a message to be entered as Turn 8 of the conversation (e.g., in response to Turn 7 of the conversation). In response, the text of the submitted message may be analyzed by the system, and one or more dialog acts may be derived by the system from the submitted message.

For example, if the CSR inputs the message text "please visit the following URL to initiate a return through the website," the system may identify a "suggestion" dialog act within the message text. In another example, if the CSR inputs the message text "can you provide me with an order number for your product order?", the system may identify a "request information" dialog act within the message text. In yet another example, if the CSR inputs the message text "we cannot handle website order returns", the system may identify a "negative expression" dialog act within the message text.

Additionally, in one embodiment, each of the one or more dialog acts may be analyzed utilizing a validation model to determine a validity score for each dialog act, where the validation model is trained utilizing historical conversations involving the CSR and/or the customer. For example, the "suggestion" dialog act may be analyzed in view of the "customer satisfaction" objective utilizing the validation model, and may be given a validity score of 10 (on a scale of 1-10, indicating a high likelihood that the objective will be obtained by the CSR in response to the message).

In another example, the "request information" dialog act may be analyzed in view of the "customer satisfaction" objective utilizing the validation model, and may be given a validity score of 5 (on a scale of 1-10, indicating a medium likelihood that the objective will be obtained by the CSR in response to the message). In yet another example, the "negative expression" dialog act may be analyzed in view of the "customer satisfaction" objective utilizing the validation model, and may be given a validity score of 1 (on a scale of 1-10, indicating a low likelihood that the objective will be obtained by the CSR in response to the message).

Further, in one embodiment, a second objective of the conversation may be submitted (e.g., "problem resolution," etc.), and each of the one or more dialog acts may be analyzed utilizing a validation model to determine a second validity score for each dialog act. In another embodiment, each objective of the conversation may be presented to the CSR, along with validity scores associated with that objective. In yet another embodiment, the message to be entered may be automatically entered as part of the conversation (e.g., as Turn 8 of the conversation) if a validity score associated with all dialog acts for the message are above a predetermined threshold. In still another embodiment, the message to be entered may be denied if a validity score associated with one or more dialog acts for the message are below a predetermined threshold.

Further still, in one embodiment, the conversation in Table 2 may be a historical conversation used to train the validation engine. For example, dialog acts and associated validity scores may be manually or dynamically identified for message text in each turn of the conversation. As a result, for a given conversation and expected outcome of the conversation, if there are N pairs of proposed dialog acts and associated validity scores given as training, this may correspond to N training examples.

In order to train the model, many such training examples from one or more conversations may be given. During feature extraction, a set of features may be extracted from such training examples. In one embodiment, features may be identified from the content of the conversations. In another embodiment, for computing conversation participant's personality traits, their previous conversations, or text from social media or other sources, may be collected.

For example, such traits may be computed from pre-taken surveys. The training method may also require an optimality objective as an input (e.g., "maximizing customer satisfaction," etc.). Such training examples, in addition to features computed from the examples, dialog acts and associated validity scores, and optimality objectives may all be used to train a machine learning model. In one embodiment, the model may be a sequential SVM-HMM that captures sequential properties of turns in a conversation. Once such a model is trained, it may be used to predict a validity score of a proposed dialog act for a given conversation.

Dialog Act Recommendation Example

In one embodiment, the conversation in Table 2 may be analyzed, utilizing a trained model. For example, one or more features may be extracted from the conversation, as well as the dialog acts. An objective of the conversation may also be identified (e.g., by the CSR or other user of the system). The features, dialog acts, and objective may be compared to features, dialog acts, and associated objectives from previous conversations used to train the model. Based on this comparison, one or more dialog acts may be recommended for entry as part of the conversation (e.g., as Turn 8 of the conversation).

For example, based on the analysis, the system may determine that a "suggestion" dialog act maximizes a likelihood of obtaining the objective of the conversation. This recommended dialog act may then be presented to the CSR. In another embodiment, a sequence of dialog acts may be recommended for entry as part of the conversation (e.g., as multiple future turns of the conversation). For example, the system may determine that a "suggestion" dialog act, followed by a "request information" dialog act during the CSR's next turn of the conversation, maximizes a likelihood of obtaining the objective of the conversation. These recommended dialog acts, as well as their associated order, may then be presented to the CSR.

Additionally, in one embodiment, after presenting the one or more recommended dialog acts, the system may receive a message to be entered (e.g., as Turn 8 of the conversation). This message may be analyzed in order to determine one or more dialog acts performed by the message. In another embodiment, the message to be entered may be automatically entered as part of the conversation (e.g., as Turn 8 of the conversation) if the one or more dialog acts performed by the message match the one or more recommended dialog acts. In still another embodiment, the message to be entered may be denied if the one or more dialog acts performed by the message do not match the one or more recommended dialog acts.

Further, in one embodiment, a second objective of the conversation may be submitted (e.g., "problem resolution," etc.), and additional recommended dialog acts may be identified for the second objective. In another embodiment, each objective of the conversation may be presented to the CSR, along with recommended dialog acts associated with that objective.

Further still, in one embodiment, the conversation in Table 2 may be between a customer and an agent, and the recommendation may be made to an agent. In another embodiment, such recommendation may be made to a customer. In another embodiment, a next best sequence of dialog acts may be predicted to achieve the target objective. In such a case, the recommendation engine may recommend a sequence of dialog acts instead of a single next dialog act.

In this way, a model may be built to recommend dialog acts to a specific party in a conversation. This recommendation may be computed from prior conversation turns, and with a goal to achieve an optimum outcome. Such a system may be trained from a set of conversations with an outcome (e.g., customer satisfaction) and features identified from the conversations. One or more of the following features may be included, such as n-grams from conversation turns, dialog acts from current participant, and previous participant, temporal and topic based features, tone/emotion based features. A machine learning model may set its optimality objective to optimize an outcome such as to maximize customer satisfaction, minimize customer frustration, etc. Once such a model is trained, for a given conversation flow, and for a given user in the conversation, the model may recommend the next best dialog act (e.g., apology, etc.) to optimize the target outcome (e.g., maximize customer satisfaction). The system may be used as a method to further automation of the customer service loop, and for automatic response-generation systems.

In one embodiment, a validity score may be given to a dialog act provided by an agent (human or automated) in a customer service dialog. Given some defined desired outcome of a customer service conversation, for example, customer satisfaction, the system may judge the dialog act provided by the agent based on how it will change the probability of the desired outcome (e.g., overall customer satisfaction, etc.) at the current point (i.e. current turn) in the conversation. The dialog act to be judged may be human-generated or automatically generated, and may require ranking for best-dialog act selection based on full conversation outcome prediction. In another embodiment, dialog acts for each conversation turn may be manually annotated. In another embodiment, a dialog act detector may be used to detect such acts for each conversation turn.

Additionally, in one embodiment, in order to judge a dialog act, the system may use a model which takes the current response with its dialog act identified (or annotated), and responses by each party from previous conversation turns (e.g., both customer and agent response), and computes a validity score for the current dialog act which indicates the likelihood of the target outcome (e.g., customer satisfaction, etc.). Such a system may be trained from a set of conversations with an outcome (e.g., customer satisfaction, etc.) and features identified from the conversations. Features may include n-grams from conversation turns, dialog acts from current participant, and previous participant, temporal and topic based features, and tone/emotion based features. A machine learning model may set an optimality objective to optimize an outcome such as to maximize customer satisfaction, minimize customer frustration, etc.

Further, in on embodiment, once such a model is trained, the model may predict, for a given conversation flow, a given user in the conversation, and the current dialog act from that user, a validity score (i.e. likelihood score) to achieve a target outcome (e.g., customer satisfaction). In this way, the system may provide real-time validation to agents about whether their intended response will increase the chances of a desired conversational outcome.

Further still, the system may be used as both a method to further automation of the customer service loop, and as a training method for providing feedback for agents and automatic response-generation systems.

In one embodiment, the recommendation engine may be modeled as a sequential decision making problem, where the notion of sequence comes from how a conversation unfolds utterance by utterance in a sequential manner. At each stage of a sequence (e.g., each utterance, etc.), the system may determine a dialog act to recommend that maximizes the overall outcome (e.g. satisfaction, problem resolution) of the conversation.

In another embodiment, reinforcement learning (RL) may be used to solve sequential decision making problems. The learning entity here may include the recommendation engine and it may be equipped with a reward function (derived from the conversation outcome) that governs how the engine is doing in terms of recommendation quality. For example, the reward function may give the engine a positive reward for a recommendation of a dialog act indicating a successful outcome of a conversation, and may give a negative reward to the engine otherwise.

Such reward system may motivate the learning entity to select the best recommendation in order to maximize rewards. Markov decision process (MDP) is one RL technique that may be used to implement the recommendation engine.

Markov Decision Process

A Markov decision process (MDP) may be represented as a tuple of (S, A, $P_{sa}$, [ ], R), where:

S=Set of states. In one example, a state may be any possible sequence of dialog acts, for example, (complaint, request for information, give information) is a state. States may also incorporate how many utterances have passed in a conversation (in this example, 3 utterances).

A=Set of actions. In the above problem setup, actions may be mapped to recommendations (e.g., a set of dialog acts).

$P_{sa}$=State transition probabilities. This may represent a distribution of what states the system will be in after executing action a in state s.

[ ]=Discount rate (the value may be between 0 and 1).

R=Reward function defined as R; S×A→$\mathbb{R}$. It may measure what real valued reward the system will get once it performs action a in state s.

Figure 10:
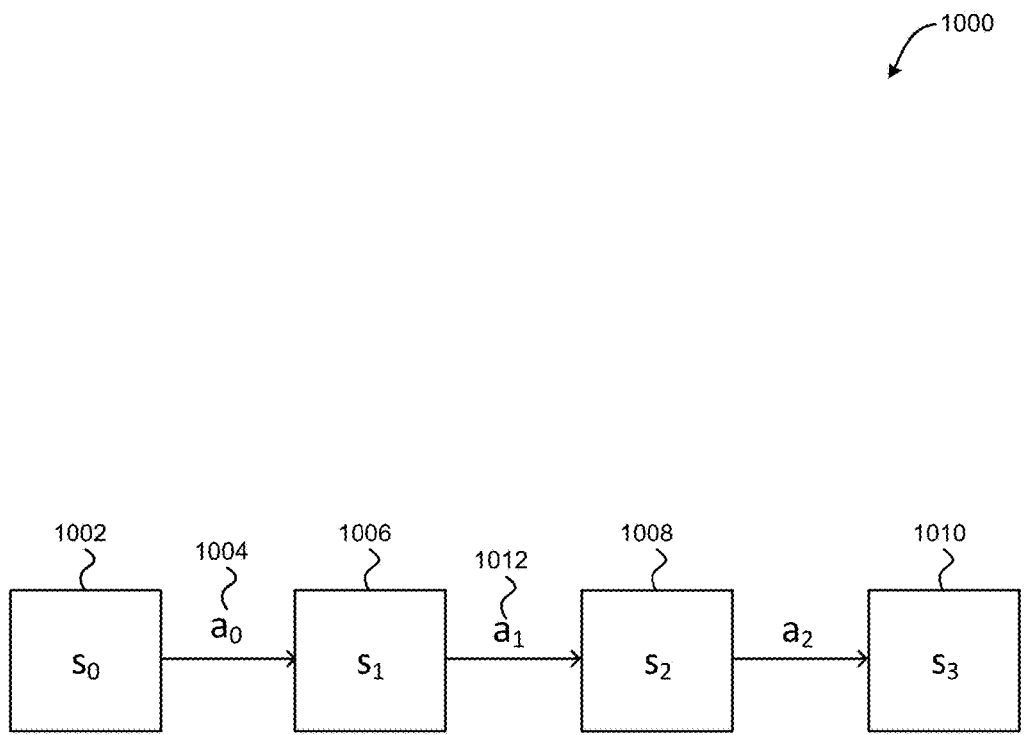
FIG. 10 illustrates an exemplary progression of an MDP over time, in accordance with one embodiment.

FIG. 10 illustrates an exemplary progression 1000 of an MDP over time. As shown, a process starts from state $s_0$ 1002 then after action $a_0$ 1004 it moves to state $s_1$ 1006, where $s_1$ 1006 is drawn from transition probability distribution $P_{s0, a0}$. Similar operations occur in states $s_2$ 1008, $s_3$ 1010, and so on.

In a dialog act recommendation setup, in each state a dialog act is recommended before moving to the next state. After visiting all the states $s_0$ 1002, $s_1$ 1006, etc. with actions $a_0$ 1004, $a_1$ 1012, etc., the total payoff may be computed as $[R(s_0, a_0)+R(s_1, a_1)+2\ R(s_2, a_2)+\ldots]$. One goal of MDP may be to select actions in each state in such a way $s_0$ that expected value $E[R(s_0, a_0)+R(s_1, a_1)+2\ R(s_2, a_2)+\ldots]$ is maximized. Finally, the output of a MDP process may be known as a policy which may include a set of actions taken in each state of the process. In one embodiment, an MDP-based recommendation engine may recommend a best dialog act at each stage of a conversation.

MDP-Based Dialogue Acts Recommendation Engine

In one embodiment, three dialogs acts may exist {Complaint, Question and Answer} and a maximum length of a conversation may be 3. Each of the modules (e.g., states, actions, transition probabilities, reward, and policy) of an MDP may now be discussed with respect to this problem setup. Note that, we will be using parenthesis and curly-braces to indicate state and action, respectively.

State: A state may be any possible sequence of dialog acts. In our example, (Complaint), (Complaint, Question) or (Question, Question) are instances of valid states. A length of a state may correspond to the length of a conversation so far. In one embodiment, the state transition may only move forward (e.g., from 1 length to 2 length to 3 length, etc.). This property may be valid since, in a conversation, we always move forward from utterance 1 to utterance 2 and so on.

Action: The set of dialog acts may correspond to the set of actions. In this example, {Complaint, Question, Answer} is a set of possible actions for each state.

State Transition Probabilities: As discussed above, a state transition probability may correspond to a possibility of moving from one state to another while executing an action. According to one example, for transition from a (Complaint) state to a (Complaint, Question) state with an action {Question}, we need to compute $P_{(complaint)\{Question\}}$ ((Complaint, Question)). We may compute this probability from data using the following equation shown in Table 3, in accordance with one embodiment. Of course, it should be noted that the exemplary equation shown in Table 3 is set forth for illustrative purposes only, and thus should not be construed as limiting in any manner.

TABLE 3

$P_{(complaint)\{Question\}}$ ((Complaint, Question)) = $\frac{\text{Frequency}((\text{Complaint, Question}))}{\text{Frequency}((\text{Complaint}))}$ Reward: The reward function may quantify the choice of an action in a state. In our case, the engine may pick such action (e.g., dialog act, etc.) for recommendation that has a higher potential to make the conversation successful (e.g. maximizing the determined objective such as satisfaction, problem resolution, etc.). For example, we can compute the reward of recommending {Question} in state (Complaint) with an objective of making the conversation satisfied, resolute from data using the following equation shown in Table 4, in accordance with one embodiment. Of course, it should be noted that the exemplary equation shown in Table 4 is set forth for illustrative purposes only, and thus should not be construed as limiting in any manner.

TABLE 4

$$R((\text{Complaint}), \{\text{Question}\}) = \left( \frac{\text{\# of satisfied conversations with \{Question\} followed by (Complaint)}}{\text{\# of total conversations with \{Question\} followed by (Complaint)}} \right) +$$

$$\left( \frac{\text{\# of resoluted conversations with \{Question\} followed by (Complaint)}}{\text{\# of total conversations with \{Question\} followed by (Complaint)}} \right)$$

Policy: The policy may include a set of optimal recommendations in different states.

Note that, in the above discussion an assumption may be made that the engine will make one dialog act recommendation in each state, but it is also possible to extend the definition states and make multiple dialog act recommendation in each state.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving, utilizing a processor, textual data associated with a real-time conversation between a first participant and a second participant;
   receiving, utilizing the processor, an objective of the first participant for the real-time conversation between the first participant and the second participant;
   determining, utilizing the processor, a dialog act to be entered by the first participant at a current point in the real-time conversation that meets the objective, utilizing a model, including:
      scoring a plurality of proposed dialog acts based on an amount that each proposed dialog act will change a probability of the objective being achieved during a current point in the real-time conversation, and
      determining the dialog act to be entered, based on the scoring;
   returning, utilizing the processor, the dialog act to the first participant;
   receiving, before entry of the dialog act by the first participant at the current point in the real-time conversation, additional textual data from the first participant in response to the returning of the dialog act, utilizing the processor; and
   entering, utilizing the processor, the additional textual data at the current point in the real-time conversation upon determining that an additional dialog act associated with the additional textual data matches the returned dialog act, utilizing the processor.

2. The computer-implemented method of claim 1, wherein the objective includes textual data indicating a desired outcome of the real-time conversation for the first participant.

3. The computer-implemented method of claim 1, wherein the objective includes a maximization of satisfaction of the second participant with respect to the real-time conversation, a minimization of frustration by the second participant with respect to the real-time conversation, a resolution of a problem of the second participant as a result of the real-time conversation, or an answering of a question by the first participant during the real-time conversation.

4. The computer-implemented method of claim 1, wherein the dialog act includes a description of an action that is to be performed by a sending of one or more portions of textual data from one participant to another participant within the real-time conversation.

5. The computer-implemented method of claim 1, wherein the dialog act maximizes a probability of the objective of the first participant being achieved during the current point in the real-time conversation.

6. The computer-implemented method of claim 1, wherein the dialog act is applied to the model, where the model is trained using earlier conversations.

7. The computer-implemented method of claim 1, wherein the model includes a sequential machine learning model.

8. The computer-implemented method of claim 1, wherein the model is trained by identifying dialog acts, features, and objectives of earlier conversations.

9. The computer-implemented method of claim 8, wherein the features are selected from a group consisting of:
   an indication of a current turn in a dialog,
   one or more previous dialog acts from the second participant,
   a previous dialog act from the first participant,
   one or more personality attributes of both the first participant and the second participant,
   a topic of a dialog computed from previous conversations,
   one or more tones exhibited in previous turns,
   an outcome of a conversation,
   word usage and punctuation,
   temporal values,
   second person reference values,
   emotion values, and
   dialog values.

10. The computer-implemented method of claim 1, further comprising:
    identifying, utilizing the processor, a plurality of communications each having an associated objective, where the plurality of communications include a plurality of historical conversations;
    automatically determining, utilizing the processor, a plurality of dialog acts within the plurality of communications, utilizing a classifier;
    determining, utilizing the processor, a plurality of features within each of the plurality of communications; and
    training, utilizing the processor, the model, utilizing the plurality of communications and associated objectives, the plurality of dialog acts, and the plurality of features.

11. The computer-implemented method of claim 1, wherein the model is a Markov model.

* * * * *